United States Patent [19]

Matsushima

[11] 3,789,425

[45] Jan. 29, 1974

[54] ELECTRO-SENSITIVE RECORDING MEDIUM HAVING A PLURALITY OF RECORDING LAYERS

[75] Inventor: Hiromi Matsushima, Tokyo, Japan

[73] Assignee: Colorfax Company Limited, Tokyo-to, Japan

[22] Filed: June 9, 1972

[21] Appl. No.: 261,392

[30] Foreign Application Priority Data

| | | |
|---|---|---|
| June 13, 1971 | Japan | 46/41837 |
| Aug. 4, 1971 | Japan | 46/58820 |
| Dec. 7, 1971 | Japan | 46/98303 |

[52] U.S. Cl. .............. 346/135, 117/215, 346/74 SB
[51] Int. Cl. .............. G01d 15/34
[58] Field of Search.. 346/135, 74 CH, 74 E, 74 ES, 346/74 S, 74 SB, 74 SC; 117/215, 217, 201; 204/2

[56] References Cited

UNITED STATES PATENTS

| | | | |
|---|---|---|---|
| 3,263,604 | 8/1966 | Dalton | 117/215 X |
| 3,434,878 | 3/1969 | Reis | 117/215 X |

*Primary Examiner*—Joseph W. Hartary
*Attorney, Agent, or Firm*—John W. Malley et al.

[57] ABSTRACT

An electro-sensitive recording medium comprising a base layer, a plurality of laminated recording layers formed on one surface of said base layer, said recording layers each being comprised of a colored layer having a relatively great resistance value and an electro-conductive layer provided on this colored layer.

10 Claims, 20 Drawing Figures

ELECTRO-SENSITIVE RECORDING MEDIUM HAVING A PLURALITY OF RECORDING LAYERS

BACKGROUND OF THE INVENTION

1. Field of the Invention

The present invention is concerned with a recording medium, and more particularly it pertains to an electro-sensitive recording medium having a laminated recording layers, which is arranged to be operative so that recording is achieved by locally destroying the required recording layer or layers by discharge.

2. Description of the Prior Art

An example of known electro-sensitive recording media is constructed, as shown in FIG. 1, by a base sheet of paper B, a black colored electro-conductive layer C provided on one face of this base B, and a semi-conductive white cover layer F formed on said layer C. REcording onto this known electro-sensitive recording medium is performed in the manner as follows. A signal voltage is applied between a recording electrode D of a desired shape which in general is of a needle type electrode which is in contact with the uppermost semi-conductive white cover layer F and a surface-contacting electrode A to locally destroy said cover layer F by discharge, thereby exposing the underlying black conductive layer C through the opening produced by said destruction, and thus a recording is achieved.

Another example of the known electro-sensitive recording media is constructed, as shown in FIG. 2, by a colored layer C provided on one surface of a base sheet of paper B, and a white electro-conductive cover layer F provided on the surface of said colored layer C via an electro-conductive thin film E. Recording onto this recording medium is effected by applying a signal voltage between a recording electrode D of an arbitrary shape which usually is needle type and which is in contact with the uppermost cover layer F and a surface-contacting electrode A to locally destroy both the conductive layer E and the cover layer F by discharge to expose the underlying colored layer C through the openings thus produced in the destroyed portions of these layers, thereby attaining a recording.

However, the known recording medium having the structure shown in FIG. 1 uses carbon black as its principal material because of the necessity of the colored layer C to have electro-conductivity. Accordingly, this recording medium of the prior art had the drawback that it was difficult to manufacture a medium using any other color than black color. Also, in the recording medium having the arrangement shown in FIG. 2, its colored layer C can employ any desired color but the color obtained from a single recording medium of this type is inevitably limited to a single color. For this reason, it was impossible to make the recording in multiplex colors which is achieved in the color photographing field.

SUMMARY OF THE INVENTION

It is, therefore, a primary object of the present invention to provide a novel electro-sensitive recording medium which, unlike the known electro-sensitive recording medium which was not capable of performing a multi-color recording, can make a multi-color recording.

Another object of the present invention is to provide an electro-sensitive recording medium which does not require the use of powder such as toner or carrier nor the use of any chemical solution or a developer gas, and which is easy to handle and inexpensive in its running cost and is capable of bearing a certain aspect of the use of those printing papers in color photographs.

Other object and attendant advantages of the present invention will become apparent by reading the description of the embodiments of this invention in conjunction with the accompanying drawings.

DESCRIPTION OF THE PREFERRED EMBODIMENTS

Figure 1:
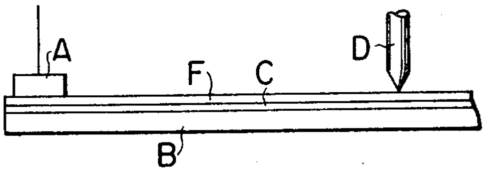
FIG. 1 PRIOR ART
FIGS. 1 and 2 are enlarged fragmentary side elevations showing structures — different from one another — of known electro-sensitive recording media, respectively.
Figure 2:
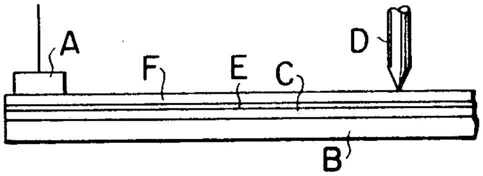
FIG. 2 PRIOR ART
Figure 3A:
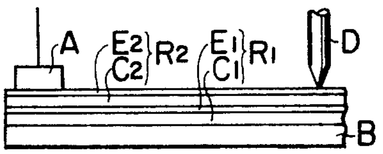
FIGS. 3A, 3B, 4A, 4B, 5A, 5B, 6A, 6B, 7A, 7B, 8A, 8B, 9A, 9B, 10A, 10B, 11A and 11B are enlarged fragmentary side elevations of embodiments of the electro-sensitive recording medium according to the present invention, representing various modifications.

Referring first to FIG. 3A, the symbol B represents a base member prepared in sheet form which is made of a paper such as "Bond" paper, tracing paper or other high quality papers, or a plastic film such as an acetate film, a vinyl chloride film, polyethylene film or a polyester film, or a laminated sheet of a paper and a plastic film. At least one surface of said base sheet member B is provided with a first recording layer $R_1$ which is comprised of a first colored layer $C_1$ being black in color and having a relatively high electric resistance and being formed, for example, by printing or by application of a mixture of pigment and zonc oxide, titanium oxide or like substance, and a first electro-conductive layer $E_1$ formed on top of said first colored layer $C_1$ and made with a thin film of either aluminum, zinc, nickel, antimony, selenium, tin or like metal which is plated, vacuum-deposited or applied to the upper surface of said first colored layer $C_1$. On top of said first recording layer $R_1$ is provided a second recording layer $R_2$ which is formed with a second colored layer $C_2$ having, for example, a red color and having a relatively high electric resistance similar to said first colored layer $C_1$ and also with a second conductive layer $E_2$ similar to said first conductive layer $E_1$.

Recording onto the electro-sensitive recording medium having the aforesaid structure is effected in the following manner. Two different signal voltages are selectively applied between a recording electrode D which is in light contact with the uppermost surface of this recording medium and a surface-contacting electrode A which is in contact, by its relatively large contact face, with the conductive layer $E_2$ which is located at the top of the medium structure. Whereby, the second conductive layer $E_2$ which is positioned immediately beneath the recording electrode D or those layers from the second conductive layer $E_2$ inclusive through the first conductive layer $E_1$ inclusive is selectively locally destroyed, so that the colored layer located immediately beneath the lower-positioned conductive layer among those layers that have been thus destroyed is exposed through the openings thus produced in those layers. More specifically, if those layers up to the conductive layer $E_1$ inclusive are destroyed locally by a voltage of, for example, 100 volts, there will appear the black color of the first colored layer $C_1$. Or if only the second conductive layer $E_2$ is locally destroyed by a voltage of, for example, 50 volts, there will be exposed the red color of the second colored layer $C_2$.

In case the signal voltage which is applied between the recording electrode D and the surface-contacting electrode A selectively from among the two different voltages which are to be applied therebetween is the lower one, the main current which will cause discharge will pass through the second conductive layer $E_2$ and will flow to the surface-contacting electrode A. However, in case said signal voltage is the higher one, the main current will pass not only through said second conductive layer $E_2$ but also through the first conductive layer $E_1$ before flowing to the surface-contacting electrode A.

Figure 3B:
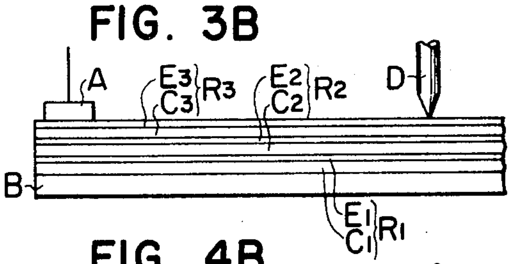

Next, the embodiment shown in FIG. 3B represents an arrangement which is comprised of a third recording layer in addition to the embodiment of FIG. 3A. More specifically, on at least one surface of a basic sheet member B which is similar to that described previously is provided a first recording layer $R_1$ comprised of a first colored layer $C_1$ having a relatively high electric resistance and containing, for example, Cyanine Blue and a first conductive layer $E_1$ formed on the surface of said first colored layer $C_1$ with a thin film of aluminum, zinc, nickel, antimony, selenium, tin or like metal by, for example, plating, vacuum-deposition, brushing or like technique. On top of said first recording layer $R_1$ is provided a second recording layer $R_2$ comprised of a second colored layer $C_2$ containing, for example, Magenta and having a relatively high resistance and a second conductive layer $E_2$ covering said layer $C_2$ and being similar to the first conductive layer $E_1$.

Furthermore, on top of this second recording layer $R_2$ is provided a third recording layer $R_3$ which is comprised of a third colored layer $C_3$ containing, for example, Yellow and having a relatively high electric resistance, and a third conductive layer $E_3$ formed on top of said third colored layer $C_3$ and being similar in type to said first and the second conductive layers $E_1$ and $E_2$.

Recording onto this electro-sensitive recording medium is achieved in the following manner. Three different signal voltages are selectively applied between a recording electrode D which is in light contact with the surface of this medium and a surface-contacting electorde A which, by its relatively large area of contacting surface, is in contact with the uppermost conductive layer $E_3$. Whereby, either only the conductive layer $E_3$ positioned immediately beneath the recording electrode D, or the layers from the conductive layer $E_3$ inclusive through the conductive layer $E_2$ inclusive, or the layers from the conductive layer $E_3$ inclusive through the conductive layer $E_1$ inclusive are locally destroyed, to thereby exposure the colored layer which is positioned immediately beneath that conductive layer which is positioned lowermost of all those locally destroyed conductive layers through the openings thus produced in these layers. Therefore, by electrically punching the layers through the first conductive layer $E_1$ by a voltage of, for example, 150 volts, there will appear the blue color of the Cyanine Blue of the first colored layer $C_1$. If, however, layers up to the second conductive layer $E_2$ inclusive are locally destroyed by a voltage of, for example, 100 volts, the red color of Magenta of the second colored layer $C_2$ will be exposed. Likewise, if only the third conductive layer $E_3$ is locally destroyed by a voltage of, for example, 50 volts, there will appear the color of the Yellow of the third colored layer $C_3$.

In case the signal voltage which is applied between the recording electrode D and the surface-contacting electrode A is the lowest one of all the three different voltages that are to be applied selectively, the main current which will cause discharge will pass from the recording electrode D through the conductive layer $E_3$ and will flow to the surface-contacting electrode A. In case this signal voltage is of the medium magnitude, the main current will pass not only through said conductive layer $E_3$ but also through the conductive layer $E_2$. Also, if this signal voltage is the highest one, the main current will also pass through the conductive layer $E_1$ in addition to said two conductive layers $E_3$ and $E_2$.

Now, in those embodiments shown in FIGS. 3A and 3B, the respective colored layers may be constructed with, for example, semi-conductive printing inks each having a high resistance and a thickness of 5 – 10 microns. It should be understood that these printing inks which are employed may be transparent or opaque.

Also, as for the base sheet of paper B, it is possible to use a base member which as a whole is dyed, instead of using one whose colored layer or layers are formed by color printing. It is to be understood also that when it is intended to form the respective conductive layers by vacuum-deposition of aluminum, the resulting coating is of a thickness of 1 micron or less, which desirably is in the range of from 500 to 1000 angstroms.

In the above-mentioned embodiments, the conductive layer $E_2$ or $E_3$ is exposed directly to the atmosphere. Accordingly, these layers can sustain a damage or can be soiled, or they can develop a change, such as oxidation, due to lapse of time. Furthermore, in view of the fact that the recording electrode D is brought into contact with the topmost conductive layer whenever recording is performed, there arises the fear and the inconvenience that the tip of this recording electrode D can also injure those sites of the layer which are not subjected to electric current.

Figure 4A:
Figure 4B:
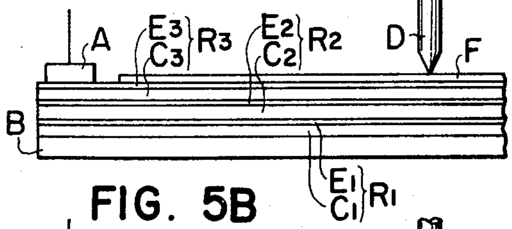

In order to eliminate these fears, there is formed a cover layer F on top of the uppermost conductive layer $E_2$ or $E_3$ as shown in FIGS. 4A or 4B, excepting the portion which is contacted by the surface-contacting electrode A. This cover layer F may be formed by applying onto said uppermost conductive layer a coating containing, for example, zinc oxide or titanium oxide as its major component and being generally use for conventional electro-sensitive recording media to a depth of, for example, about 10 microns. This cover layer F made in this way has generally a semi-conductive nature having a relatively high resistance.

In these embodiments of FIGS. 4A and 4B, that portion of the respective conductive layers $E_2$, $E_3$ which is in contact with the surface-contacting electrode A is exposed. If it is intended to protect such portion also, it is only necessary to extend the application of said coating or the cover layer F on to such portion, as shown in FIGS. 5A and 5B.

Figure 5A:
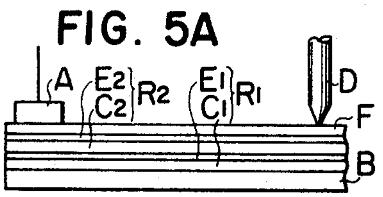
Figure 5B:
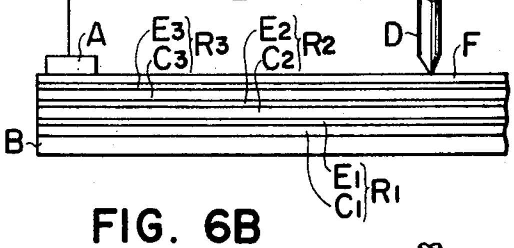

Now, by referring to FIGS. 5A and 5B, let us assume that the recording electrode D and the recording medium of the present invention are making relative movement while these two are contacting each other lightly. Under this state, let us suppose that a signal voltage is applied between the recording electrode D and the surface-contacting electrode A. It should be remembered that although said cover layer F is of a relatively high resistance, this layer has a very small thickness of the order of 10 microns. On the other hand, the respective conductive layers $E_1$, $E_2$ and $E_3$ are of a very low resistance. Therefore, the current will pass from the recording electrode D to the desired conductive layer by making the shortest distance, and after passing through this latter conductive layer, it will take the shortest distance again to enter into the surface-contacting electrode A. During this passage of current, there takes place a discharge.

Description has been made of those embodiments where the surface-contacting electrode A is common to all of the conductive layers independently of the number of the recording layers formed. However, those embodiments which will be described hereuner each has a separate surface-contacting electrode for each conductive layer of these media.

Figure 6A:
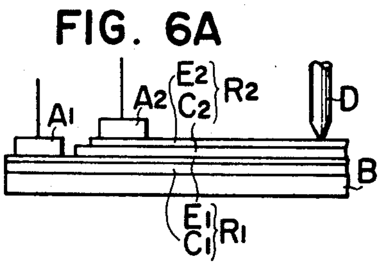
Figure 6B:
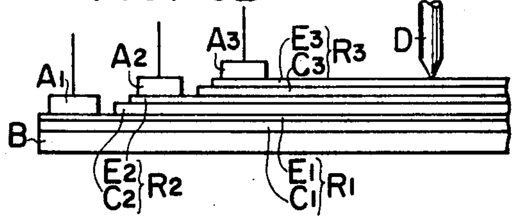

More specifically, those embodiments shown in FIGS. 6A and 6B are such that the numbers of their layers are equal to those of the embodiments shown in FIGS. 3A and 3B. In these instant embodiments, however, it will be noted that, in the embodiment shown in FIG. 6A, a part of the first conductive layer $E_1$ is exposed also, in addition to the uppermost conductive layer. Also, in the embodiment of FIG. 6B, a part of the first conductive layer $E_1$ and a part of the second conductive layer $E_2$ are exposed also.

Recording onto the medium shown in FIG. 6A of these two media is performed in the manner as described below. A signal voltage is applied between the recording electrode D which is in light contact with the surface of this medium and a surface-contacting electrode selected from those surface-contacting electrodes $A_1$ and $A_2$ which are in contact with the conductive layers $E_1$ and $E_2$ respectively. Whereby, the conductive layer $E_2$ positioned immediately beneath the recording electrode D, or the layers from this conductive layer $E_2$ inclusive through the conductive layer $E_1$ inclusive are destroyed locally respectively so that the colored layer positioned immediately beneath the lowermost conductive layer of all those conductive layers thus destroyed is exposed, thereby achieving the recording.

On the other hand, recording onto the medium shown in FIG. 6B is effected in the following manner. A signal voltage is applied between the recording electrode D which is in light contact with the surface of this medium and a surface-contacting electrode selected from those surface-contacting electrodes $A_1$, $A_2$ and $A_3$ which are in contact with the conductive layers $E_1$, $E_2$ and $E_3$, respectively. Whereby, either the conductive layer $E_3$ positioned immediately beneath the recording electrode D, or the layers from this conductive layer $E_3$ inclusive through the conductive layer $E_2$ inclusive, or the layers from this conductive layer $E_3$ inclusive to the conductive layer $E_1$ are locally destroyed so that the colored layer which is positioned immediately beneath the conductive layer located lowermost in position of all these locally destroyed conductive layers is exposed, and the recording is effected.

It should be understood, however, that in these embodiments shown in FIGS. 6A and 6B, the conductive layers $E_2$, $E_3$ are exposed. Therefore, these conductive layers can sustain a damage or can be soiled or can develop a change, such as oxidation, due to lapse of time. Also, in view of the fact that the recording electrode is brought into contact with the uppermost-positioned conductive layer, it may occur that those sites of this conductive layer which are not subjected to electric current are damaged.

Figures 7A, 7B, 8A, 8B, 9A, 9B, 10A, 10B, 11A, 11B:
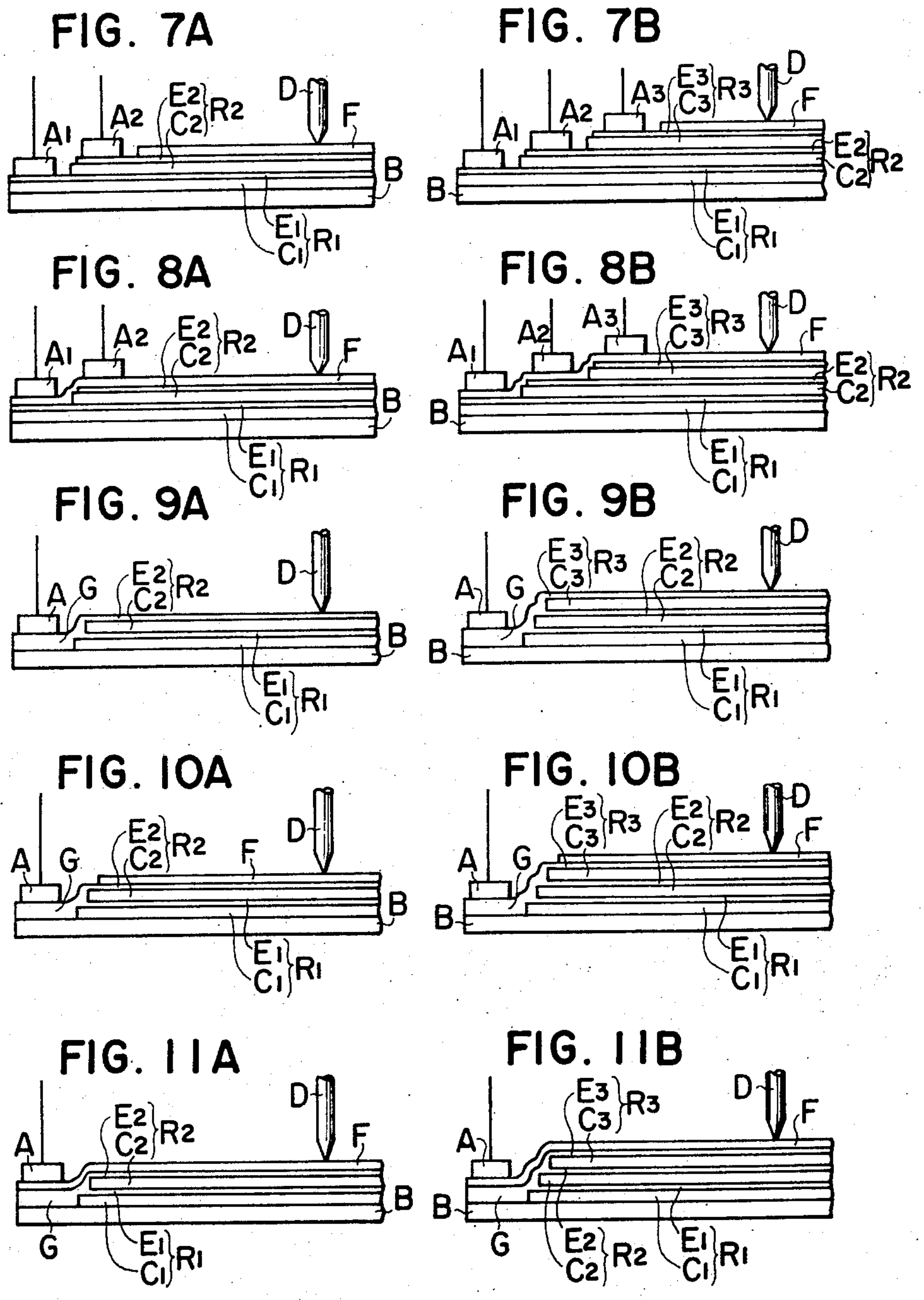

In order to eliminate such inconveniences, there is formed, as shown in the embodiments of FIGS. 7A and 7B, a cover layer F on each uppermost conductive layer $E_2$ or $E_3$ excepting those areas which contact the surface-contacting electrode, said cover layer F being similar to that shown in the embodiments of FIGS. 4A and 4B.

In these embodiments of FIGS. 7A and 7B, those portions of the respective conductive layers which are in contact with the surface-contacting electrodes, respectively, are exposed. In case it is intended to protect such portions also, it is only necessary to extend the application of coating or the aforesaid cover layer F to these portions, as shown in FIGS. 8A and 8B.

In FIGS. 8A and 8B, let us now assume that the recording electrode D and the recording medium of the present invention are making relative movement while these two are in light contact with each other. Under such state, let us assume also that a signal voltage is applied between the recording electrode D and the surface-contacting electrode A. Although the cover layer F is of a relatively high resistance, this cover layer has a very small thickness of 10 microns or less. Also, the respective conductive layers are of a very low resistance. Therefore, the current will flow from the recording electrode D to the desired conductive layer by following the shortest distance. This current will pass through this conductive layer and enter into the surface-contacting electrode by again taking the shortest distance. A discharge takes place during this passage of current.

It should be understood that those embodiments which have been described above are such that their respective conductive layers are independent relative to each other irrespective of the number of these conductive layers. In those embodiments which will be discussed hereunder, however, their respective conductive layers are connected to each other.

As shown in FIG. 9A, thee is provided — on at least one surface of the base sheet B which is similar in type to those of the preceding embodiments — a first recording layer $R_1$ which is comprised of a first colored layer $C_1$ having, for example, a black color and a first conductive layer $E_1$ formed on top of this first colored layer $C_1$ with a thin film of aluminum, zinc, nickel, antimony, selenium, tin or like metal which is produced thereon by relying on either plating, vacuum-deposition or brushing technique. On top of this first recording layer $R_1$ is provided a second recording layer $R_2$ which is comprised of a colored layer $C_2$ which is, for example, red in color and a second conductive layer $E_2$ which is similar to that described above. These conductive layers $E_1$ and $E_2$ are connected integrally to each other at their end portions G.

Recording onto this electro-sensitive recording medium having the foregoing structure is performed in the following manner. Two kinds of signal voltages are selectively applied between the recording electrode D which is brought into light contact with the surface of this medium and the surface-contacting electrode A which is in contact with the junction G of the two conductive layers $E_1$ and $E_2$. Whereby, the conductive layer $E_2$ which is positioned immediately beneath the recording electrode D, or the layers from the conductive layer $E_2$ inclusive through the conductive layer $E_1$ inclusive are locally destroyed. As a result, the colored layer located immediately beneath the conductive layer positioned lowermost of all the locally destroyed layers is exposed, thereby effecting the recording. More spcifically, if those layers including the first conductive layer $E_1$ are locally destroyed by a voltage of, for example, 100 volts, there will appear the black color of the first colored layer $C_1$. Whereas, if only the second conductive layer $E_2$ is locally destroyed by a voltage of, for example, 50 volts, there will appear the red color of the second colored layer $C_2$.

Next, in the embodiment of FIG. 9B, there is provided on at least one surface of the base sheet B a first recording layer $R_1$ which is comprised of a first colored layer $C_1$ containing, for example, Cyanine Blue and a first conductive layer $E_1$ which is similar to that described above and which is formed on top of this first colored layer $C_1$. On the upper surface of this first recording layer $R_1$ is provided a second recording layer $R_2$ which is comprised of a second colored layer $C_2$ of, for example, Magenta and a second conductive layer $E_2$ which is formed on this second colored layer $C_2$ and which is similar to that described above. Furthermore, on top of this second recording layer $R_2$ is provided a third recording layer $R_3$ which is comprised of a third colored layer $C_3$ of Yellow and a third conductive layer $E_3$ which is similar to that stated above. Also, these conductive layers $E_1$, $E_2$ and $E_3$ are connected integrally to each other at their respective end portions G.

Recording onto this electro-sensitive recording medium having the foregoing arrangement is achieved in the following manner. Three kinds of signal voltages are selectively applied between the recording electrode D which is in light contact with the surface of this medium and the surface-contacting electrode A which is in contact with the respective conductive layers $E_1$, $E_2$ and $E_3$ at their junction G. Whereby, the conductive layer $E_3$ positioned immediately beneath the recording electrode D, or those layers from the conductive layer $E_3$ inclusive through the conductive layer $E_2$ inclusive, or those layers from the conductive layer $E_3$ inclusive through the conductive layer $E_1$ inclusive are locally destroyed. As consequence, the colored layer which is located immediately beneath the conductive layer positioned lowermost of all the locally destroyed layers is exposed, and thus the recording is performed. It should be understood that in this instance if the layers including the first conductive layer $E_1$ are locally destroyed by a voltage of, for example, 150 volts, there will appear the blue color of the first colored layer $C_1$. And if those layers including the second conductive layer $E_2$ are destroyed locally by a voltage of, for example, 100 volts, there will be exposed the red color of the second colored layer $C_2$. Whereas, if the third conductive layer $E_3$ alone is locally destroyed by a voltage of, for example, 50 volts, there will appear the yellow color of the third colored layer $C_3$.

It should be noted that in this embodiment, the respective conductive layers are exposed, so that they can be subjected to damaging or soiling, or they can develop a change such as oxidation due to lapse of time. Also, since the recording electrode is brought into contact with the topmost conductive layer, it may occur that those sites of this conductive layer which are not subjected to electric current are injured.

These fears and inconveniences can be eliminated by arranging the media as follows. As shown in the embodiments of FIGS. 10A and 10B, the surface of the topmost conductive layer is provided with such a cover layer F as that described previously excepting the site of junction G which is connected to the surface-contacting electrode A.

In these embodiments shown in FIGS. 10A and 10B, the junction G of the respective conductive layers which is in contact with the surface-contacting electrode is exposed. In the event that it is intended to protect this junction G also, it is only necessary to extend, as shown in FIGS. 11A and 11B, said coating or the cover layer F to this junction.

By referring to FIGS. 11A and 11B, let us now assume that the recording electrode D and the recording medium of the present invention are making relative movement at a relatively high speed while these two are contacting lightly with each other. Let us also assume that, under this condition, a signal voltage is applied between the recording electrode D and the surface-contacting electrode A. It should be remembered here that although the cover layer F is of a relatively high resistance, this layer F has a very small thickness of the order of 10 microns or less. On the other hand, the respctive conductive layers are of a very low resistance. Accordingly, the current will flow from the recording electrode D to the desired conductive layer by covering the shortest distance and in accordance with the magnitude of the signal voltage applied. After passing through this conductive layer, the current will enter into the surface-contacting electrode by again following the shortest distance. During this passage of electric current, there takes place a discharge.

The magnitude of said signal voltage can vary depending on the characteristic and the thickness of each of the colored layers, the conductive layers and the cover layer. Generally speaking, the magnitude of the voltage required for destroying the uppermost conductive layer is of the order of 20 volts or more, and the magnitude of the voltage required for destroying the lowermost conductive layer $E_1$ is in the range from about 50 volts to about 200 volts. Depending on conditions, however, the magnitude of the voltage required for such purpose can depart from the foregoing limits.

In the foregoing embodiments, the kinds of color of the colored layers have been mentioned as being black and red in the instance of two colors, whereas Cyanine Blue, Magenta and Yellow were used in the instance of three colors. It should be understood, however, that any combination of any desired colors may be used. Also, the number of colors to be used is not limited to the aforesaid two and three, but it may be increased to four or more by increasing the number of colored layers to four or more accordingly, so long as the recording by destruction of layers by discharge is feasible.

A mixed color such as green may be obtained by applying electric current alternately to the conductive layer for the yellow recording layer and to the conductive layer for the blue (Cyanine Blue) recording layer. By doing so, an yellow spot will be positioned adjacent and close to a blue spot due to the relative movement of the recording electrode and the recording medium.

Therefore, as a whole, these adjacently positioned yellow and blue spots will give the optical effect of green. Such an effect will also apply to a mixed color produced with three or more different colors.

Furthermore, it is needless to say that a black colored layer may be provided where required.

Also, the color of the cover layer need not be limited to white, but any other color may be selected as desired.

In the embodiments illustrated, the electro-sensitive recording layers are provided on only one side of the base sheet. These recording layers may be provided on both sides.

As will be clear from the foregoing statement, according to the present invention, there is obtained a multi-color electro-sensitive recording medium which permits a recording to be made in any desired colors, and which can be used for many and extensive purposes such as color printing, color recording, color facsimile and color telephoto news paper, and which requires no such powder as toner and carrier, or chemical solution or developer gas, and which has no sensitivity to light and accordingly is easy to handle and to keep.

It would be understood that the feature of the present invention lies in the fact that a plurality of recording layers each comprising a colored layer having a relatively high resistance value and a conductive layer provided on this colored layer are laminated one upon another. Accordingly, so long as the recording medium has the aforesaid basic structure, it is free to provide, for example, a peel-off layer between a colored layer and its conductive layer to thereby facilitate easy peeling of one of these two members from the other, and it is also free to provide various other modifications and processing as required.

I claim:

1. An electro-sensitive recording medium comprising:

a base layer and a plurality of recording layers formed one upon another on at least one surface of said base layer;

said recording layers each being comprised of:

a. a colored layer different in color for each colored layer and having a relatively great resistance value and;

b. a thin electro-conductive layer provided on each colored layer whereby recording is achieved by locally destroying the selected electro-conductive layer and any recording layer positioned above said electro-conductive layer so that the colored layer located immediately beneath said electro-conductive layer is exposed.

2. An electro-sensitive recording medium comprising:

a base layer and a plurality of recording layers formed one upon another on at least one surface of said base layer;

said recording layers each being comprised of:

a. a colored layer different in color for each colored layer and having a relatively great resistance value and;

b. a thin electro-conductive layer provided on each colored layer;

a part of each of the electro-conductive layers excepting the uppermost electro-conductive layer extending beyond that electro-conductive layer positioned immediately thereabove, and the surface of said uppermost electro-conductive layer and the surfaces of said extended portions of the other electro-conductive layers being covered by a cover layer.

3. An electro-sensitive recording medium according to claim 2, in which said base layer is a paper sheet.

4. An electro-sensitive recording medium according to claim 2, in which said base layer is a plastic sheet.

5. An electro-sensitive recording medium according to claim 2, in which said base layer is comprised of a paper sheet and a plastic sheet.

6. An electro-sensitive recording medium according to claim 2, in which the surface of the recording layer positioned topmost is covered with a semi-conductive cover layer.

7. An electro-sensitive recording medium according to claim 6, in which a part of said cover layer is cut off.

8. An electro-sensitive recording medium according to claim 2, in which a part of the surface of each of said electro-conductive layers is exposed to the atmosphere.

9. An electro-sensitive recording medium comprising:

a base layer and a plurality of recording layers formed one upon another on at least one surface of said base layer, said recording layers each being comprised of a. a colored layer different in color for each colored layer and having a relatively great resistance value; and b. a thin electro-conductive layer provided for each colored layer, the respective electro-conductive layers being electrically connected to each other, forming a junction; and the surface of said uppermost recording layer and the surface of said junction being covered by a semi-conductive layer.

10. An electro-sensitive recording medium according to claim 9, in which said cover layer is partly cut off at a position above said junction.

* * * * *